(12) United States Patent
Weare

(10) Patent No.: US 7,523,109 B2
(45) Date of Patent: Apr. 21, 2009

(54) DYNAMIC GROUPING OF CONTENT INCLUDING CAPTIVE DATA

(75) Inventor: Christopher Weare, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 411 days.

(21) Appl. No.: 10/746,627

(22) Filed: Dec. 24, 2003

(65) Prior Publication Data

US 2005/0149473 A1 Jul. 7, 2005

(51) Int. Cl.
*G06F 17/30* (2006.01)

(52) U.S. Cl. ..................... 707/7; 707/1; 707/2; 707/5; 707/6; 707/10; 707/100; 707/101; 707/102

(58) Field of Classification Search ............. 707/1, 707/102
See application file for complete search history.

(56) References Cited

U.S. PATENT DOCUMENTS

| | | | | |
|---|---|---|---|---|
| 6,041,323 | A * | 3/2000 | Kubota | 707/5 |
| 6,526,440 | B1 | 2/2003 | Bharat | |
| 6,529,903 | B2 | 3/2003 | Smith et al. | |
| 6,615,209 | B1 | 9/2003 | Gomes et al. | |
| 6,658,423 | B1 | 12/2003 | Pugh et al. | |
| 6,678,681 | B1 | 1/2004 | Brin | |
| 2002/0123988 | A1 | 9/2002 | Dean et al. | |
| 2002/0133481 | A1 | 9/2002 | Smith et al. | |
| 2003/0182310 | A1* | 9/2003 | Charnock et al. | 707/104.1 |
| 2005/0131932 | A1 | 6/2005 | Weare | |

OTHER PUBLICATIONS

Andrew J. Kurtz et al, "Topic Detection and Interest Tracking in a Dynamic Online News Source," Mar. 2003, ACM, pp. 122-124.*

Jianying Hu et al., "Combined-Media Video Tracking for Summarization," 2001, ACM, 502-505.*
Watters, Carolyn et al., "Rating News Documents for Similarity," 2000, Journal of the American Society for Information Science, vol. 51, issue 9, pp. 793-804.*
S. Brin and L. Page. *The Anatomy of a Large-Scale Hypertextual Web Search Engine.* Aug. 7, 2000. http://www7.scu.edu.au/programme/fullpapers/1921/com1921.htm.
C. Watters and Hong Wang. "Rating News Documents for Similarity" *Journal of the American Society for Information Science*, pp. 793-804. 2000.
A. Kurtz and J. Mostafa. "Topic Detection and Interest Tracking in a Dynamic Online News Source" *JCDL '03* May 1-2, 2003, Houston, Texas . . . pp. 122-124.
S.H. Lin and J.M. Ho. "Discovering Informative Content Blocks form Web Documents" *SIGKDD '02* Jul. 23-26, 2002, Edmonton, Alberta, Canada. pp. 588-593.
J. Hu, J. Zhong and A. Bagga. "Combined-Media Video Tracking for Summarization" *MM '01*, Sep. 30-Oct. 5, 2001, Ottawa, Canada. pp. 502-505.

* cited by examiner

*Primary Examiner*—Neveen Abel Jalil
*Assistant Examiner*—Farhan Syed

(57) ABSTRACT

A method and a system for dynamically updating information including captive data for publication. 'Captive data' is defined as data accompanied by or associated with an identifying tag such as a caption. The captive data may include image, audio or visual data, among other types of data. Documents and other information having common characterizing features are grouped together. Captive data accompanied by identifying tags having characterizing features in common with a grouping of documents or other information are assigned to the grouping. The information obtained in the grouping step is used to determine how to publish the information contained in a cluster based on a customer request for information.

20 Claims, 4 Drawing Sheets

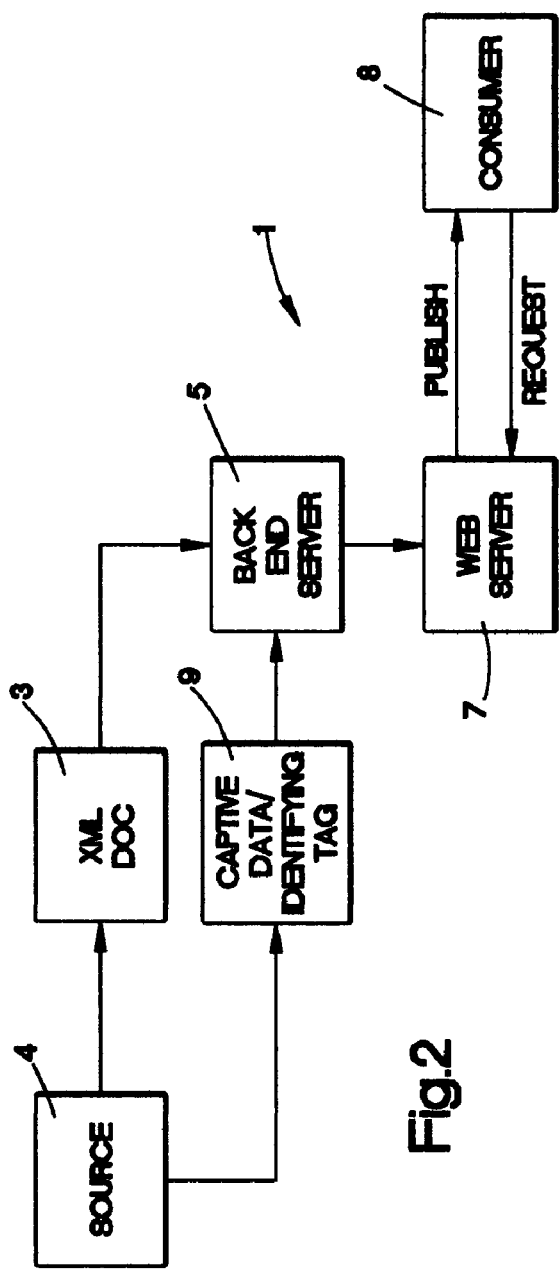
Fig.2
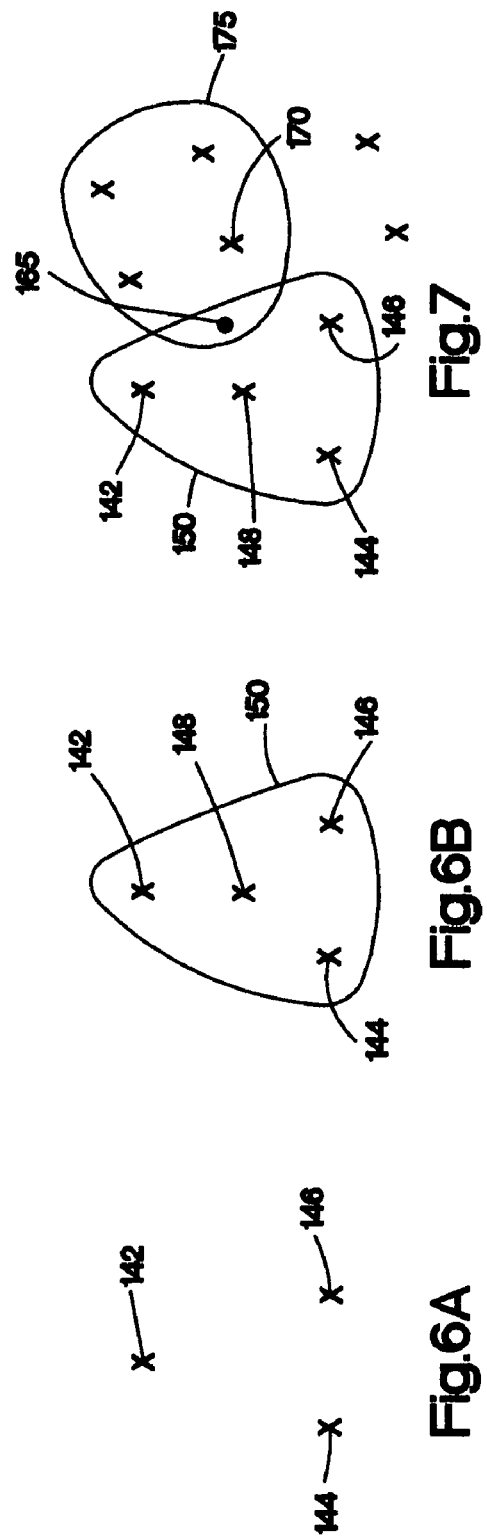
Fig.7
Fig.6B
Fig.6A

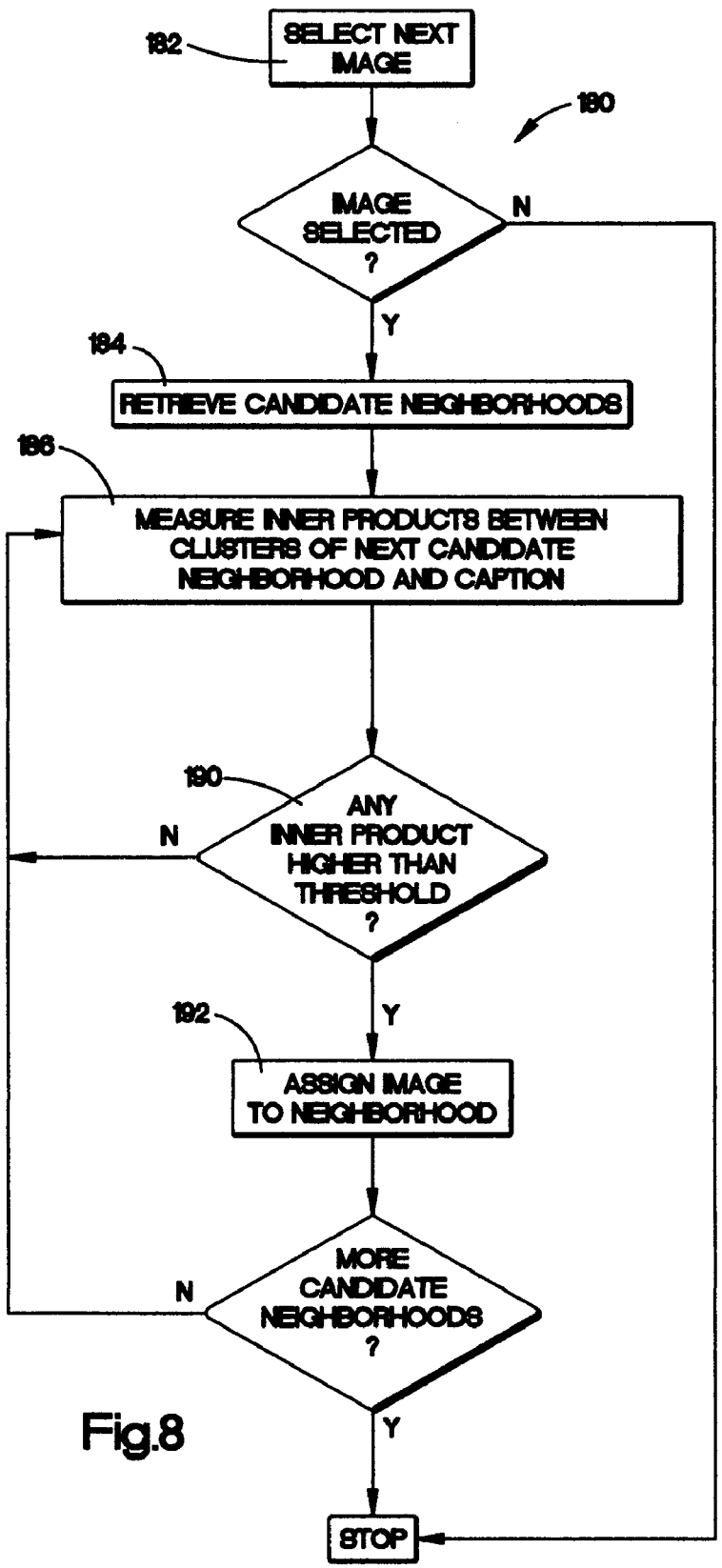
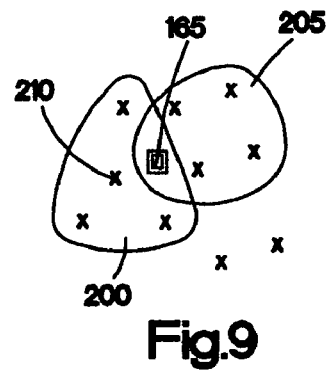
Fig.8
Fig.9

DYNAMIC GROUPING OF CONTENT INCLUDING CAPTIVE DATA

FIELD OF THE INVENTION

The present invention concerns document analysis for automatic categorizing and republication of the document.

BACKGROUND ART

The addition of non-textual content such as images, audio clips and video clips complements textual descriptions by engaging a user's senses in the presentation of the information described in the text. Displaying such non-textual content with links to the text also serves to attract the attention of users who may have an interest in information of the type described in the text. A content publisher may receive non-textual content of this type from media sources independently of related textual information.

Users who wish to find relevant and up-to-date information from sources of data such as the Internet face a continuous deluge of new content. By grouping like content together, the task of sorting through this large amount of data can be simplified.

Existing technology has been used to automatically separate the content of a web based original document. An article to Lin et al. entitled "Discovering Informative Content Blocks from Web Documents" (SIGKDD '02, Jul. 23-26, 2002 Copyright 2002 ACM) describes a process of automatically removing redundant data from meaningful content from web text. The goal of this article is to separate meaningful data from redundant, repetitive and usually un-interesting data appearing on web pages.

Once the redundant data has been stripped from the page, the text content of the web page can be classified using known indexing techniques. The indexed web pages can then be evaluated by existing web search engines such as Google, MSN or Yahoo. The Lin et al. article discards as irrelevant portions of the web pages deemed to have redundant data, but does not change the indexing or evaluation of text pages found to have meaningful information.

A publication to Watters et al. entitled "Rating News Documents for Similarity" (Journal of the American Society for Information Science, 51(9): 793-804, 2000.) concerns a personalized delivery system for news documents. This publication discusses a methodology of associating news documents based on the extraction of feature phrases, where feature phrases identify dates, locations, people, and organizations. A news representation is created from these feature phrases to define news objects that can then be compared and ranked to find related news items.

In the context of the larger search problem, the current invention provides a means whereby users can quickly browse through a large collection of information and spot those items that are of interest to them by presenting only the content that is conceptually distinct.

SUMMARY OF THE INVENTION

A method and a system are disclosed for dynamically updating information for publication. Meaningful content is extracted from information received from multiple sources. The information can contain text, sound, images and video. A set of characterizing features for the received information is determined. Information having common characterizing features is grouped together into a number of clusters. The information obtained in the grouping step is used to determine how to publish the information contained in a cluster based on a customer request for information. This customer request can be based on a query or a customer profile assigned to the customer.

In addition, a method and a system are disclosed for dynamically updating 'captive data' for publication. 'Captive data' is defined as data accompanied by or associated with an identifying tag such as a caption. Such data is referred to as 'captive data' in that the method and system analyzes the identifying tag rather than the data; thus, the identifying tag controls the classification of the data. Examples, though not the only examples, of such captive data are image, audio and video data accompanied by textual captions which describe the digitize images, sounds or videos.

Captive data accompanied by identifying tags having characterizing features in common with a grouping of documents or other information is assigned to the grouping. Thus, the method and system provide for the assignment of non-textual data which cannot be analyzed and compared independently in a convenient manner with documents and other information in the grouping absent the identifying tags.

One use of the invention is for use with an automated news portal which uses dynamic content clustering to continually identify and modify collections of news stories that are being presented at web-based news sites around the globe. As articles come into the automated news portal they are assigned to pre-existing clusters if they are closely associated with previously covered stories; otherwise they are assigned to new clusters. Every few minutes the state of the clusters within the automated new portal is recorded to a catalog file which is then used to build the various automated new portal web pages.

These and other objects, advantages and features will become better understood from the accompanying exemplary embodiment which is described in conjunction with the accompanying drawings.

BRIEF DESCRIPTION OF THE DRAWINGS

FIG. 2 is a schematic representation of an internet based document retrieval system for presenting data to the requester;

FIGS. 6A and 6B are schematic depictions of document data clusters associated together to form a neighborhood of such data clusters;

FIG. 7 is a schematic depiction of overlapping neighborhoods of clusters;

FIG. 8 is a flowchart of processing steps performed during a classification of captive data such as images to group that content with related documents; and FIG. 9 is a schematic depiction of neighborhoods of clusters sharing captive data such as an image.

EXEMPLARY SYSTEM FOR PRACTICING THE INVENTION

Figure 1:
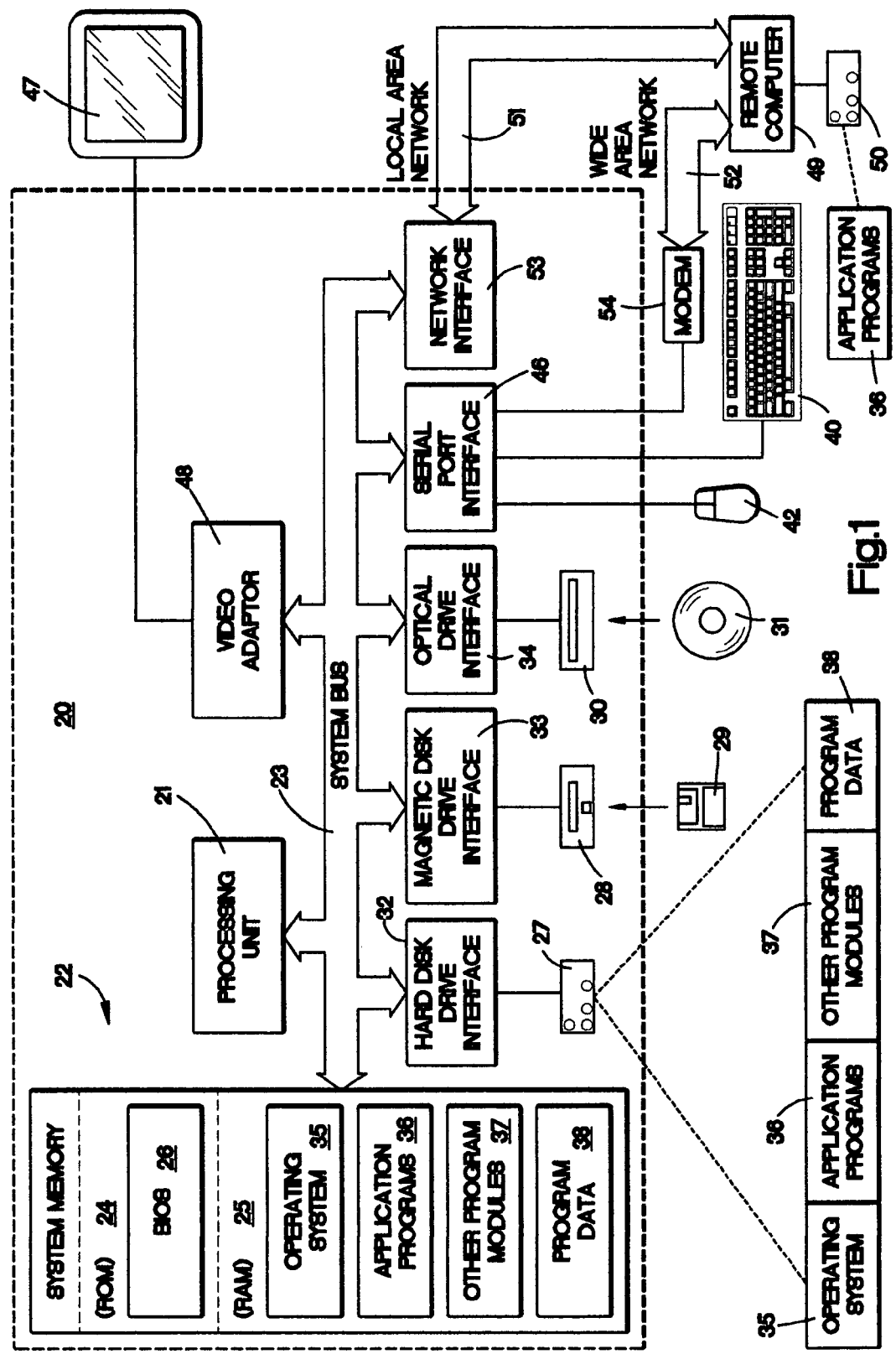
FIG. 1 is a representative computer system used in implementing components of an exemplary embodiment of the present invention.

FIG. 2 depicts a representative system 1 for evaluating documents and returning results based on a request for information from a user. The system includes a preprocessor that is implemented on a back end server 5 having data storage for receiving a document 3 from one of a plurality of document sources 4. The back end server 5 evaluates the document for subsequent publication. FIG. 1 depicts the architecture of a representative computer that could be used to implement the back end server. Although the invention is not limited to evaluation of text documents, in one exemplary embodiment, the received document contains text in an 'XML' format. News documents, for example, are prepared by the Associated Press, Reuters, the New York Times, CNN, etc. (representative sources 4) and made available to the system 1 on a periodic basis as news breaks around the world.

The exemplary preprocessor is part of a back end server computer 5 executing an operating system, such as Windows Server™ software and including storage for a large number of documents that are evaluated or classified. Text data contained in each received XML document is evaluated or classified. A database of documents is updated so that an incoming request for documents (from a user for example) can be responded to with up to date information by publication of the documents deemed most suitable based on criteria discussed below. The evaluation or classification is accomplished by the back end server 5 by grouping together documents having a commonality into a number of clusters of documents referred to as a catalog of those documents.

The exemplary system 1 also receives captive data 9, which preferably comprises non-textual data or audiovisual data such as image data, video data and sound data but also may comprise textual data. More specifically, one or more of the documents sources 4 provides captive data 9 to the back end server 5 accompanied in one-to-one relationship by identifying tags related to the captive data 9. The identifying tags preferably are associated with the captive data 9 by the sources 4. The captive data 9 is received in any format recognized by the operating system and application software resident on the back end server 5 and the choice of format is within the ordinary skill in the art. The identifying tags consist of any data, in any format, susceptible of analysis into tokens for comparison with like data to permit classification of the captive data 9. Although not critical to the invention, the back end server 5 may include means to re-format the captive data 9 and its accompanying identifying tags so as to facilitate evaluation of the captive data 9 by the back end server 5; transmission of the captive data 9 to the consumer 8; and display of the captive data 9 by a browser or the like used by the consumer 8 to view such content.

For example, where the captive data 9 comprises image data, acceptable identifying tags include text files comprising captions describing the images digitized in the image data. (Such text files will be referred to hereinafter as 'captions'.) The captions preferably are provided by the sources 4. The lengths of the captions will typically be limited, either to a particular number of words (e.g., ten to twenty) or to a particular string length.

The text or other data contained in the identifying tags which accompany the captive data 9 is evaluated or classified. The captive data 9 is grouped with documents 3 on the basis of commonality between the documents 3 and the identifying tags accompanying the captive data 9. It follows that, where the identifying tags are captions, the grouping can be carried out by techniques analogous to those capable of grouping incoming documents or textual information into clusters.

The FIG. 2 web server 7 makes use of an updated catalog of cluster data from the back end server 5. The web server 7 makes available, to a user or consumer 8, documents 3 and captive data 9 contained within a cluster or a neighborhood of clusters as judged by the web server 7 as being most relevant. The judging of relevance is based on a number of criteria, some of which may include information made available to the web server 7 from a particular consumer 8.

For ease and clarity of exposition only, the exemplary system and method for evaluating or classifying captive data will be described in terms of evaluating or classifying image data associated with captions unless otherwise noted. Those skilled in the art will recognize that the invention is not limited thereto. For example, where the captive data 9 includes audio or video data, acceptable identifying tags might include text files comprising transcriptions of the audio portion of the data prepared manually or by interpretive software. Acceptable identifying tags for images might also include names of key words generated by image (e.g., facial) recognition software. Acceptable identifying tags further might include files containing sound data such as digitized music susceptible of comparison for detecting similarity of styles or motifs. Other suitable identifying tags will be apparent to those of ordinary skill in the art.

Computer System

FIG. 1 depicts an exemplary data processing system. A data processing system such as the system shown in FIG. 1 can act as both the back end server 5 and the web server 7. The system includes a general purpose computing device in the form of a conventional computer 20, including one or more processing units 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures.

The system memory includes read only memory (ROM) 24 and the random access memory (RAM) 25. A basic input/output system 26 (BIOS), containing the basic routines that help to transfer information between elements within the computer 20, such as during start-up, is stored in ROM 24.

The computer 20 further includes a hard disk drive 27 for reading from or writing to a hard disk, not shown; a magnetic disk drive for reading from or writing to a removable magnetic disk 29; and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor, personal computers (PCs) typically include other peripheral output devices (not shown), such as speakers and printers.

The computer 20 may operate in a networked environment using logical connections to one or more remote computers, such as a remote computer 49. The remote computer 49 may be another PC, a server, a router, a network PC, a peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 and other means for establishing communications over the WAN 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Figure 5:
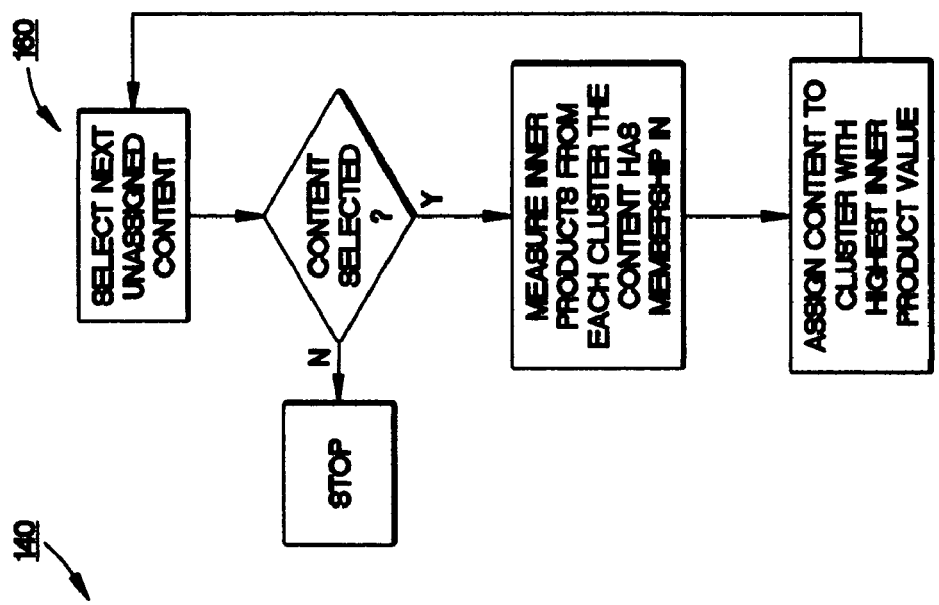
FIGS. 3-5 are flowcharts of document processing steps performed during classification of those documents for efficient access to a requester.
Figure 4:
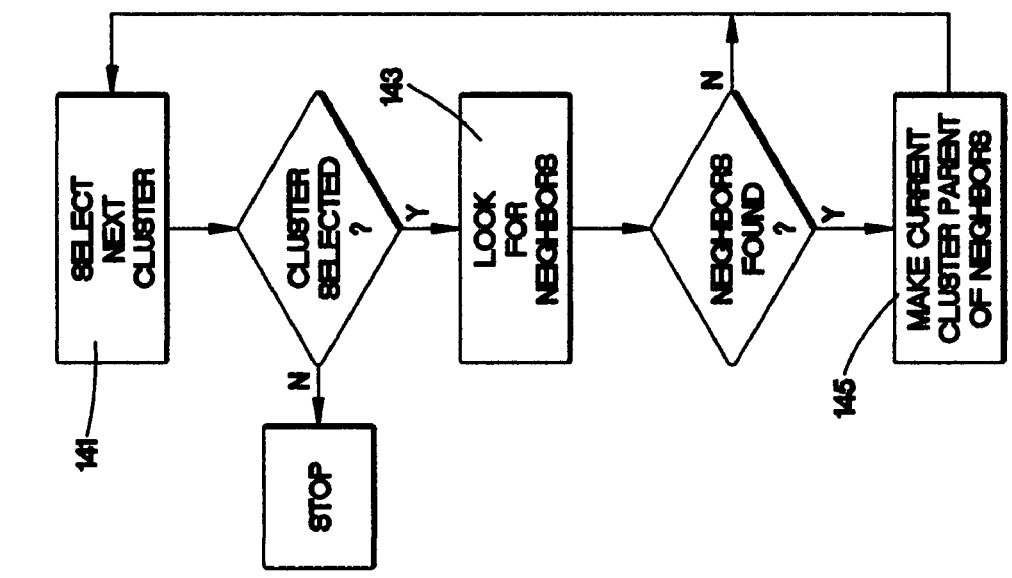
Figure 3:
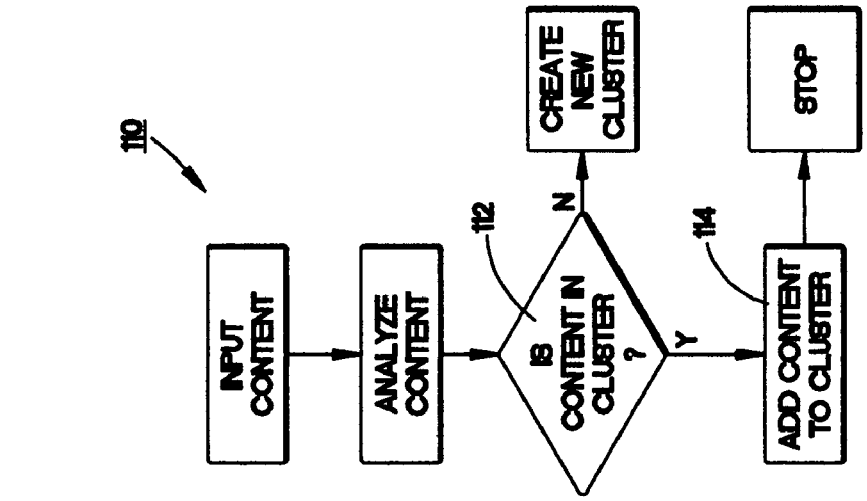

FIGS. 3-5 depict an exemplary process performed on incoming information by the back end server 5. The process is divided into three phases: an input phase 110, a coalesce phase 140, and an assignment phase 160. During the input phase 110, data having content enters the system. During the coalesce phase 140, an exemplary system groups common data together by clustering the data and stores it in a database. During the assignment phase 160, the system makes an assignment of content to a cluster neighborhood. This assignment is also maintained in a database of records that describe the cluster or clusters and neighborhood of the incoming content.

The responsibilities of the three phases of the present invention are carried out by two major components: an analysis component, and a clustering component. The analysis component is responsible for reducing the data contained in a piece of content to a relevance-sorted list of the top N most important tokens present in the content. The analysis occurs during the input phase 110. The content can be text, video, audio, etc. The specific technique used for the reduction depends on the type of content. The clustering component is responsible for assigning content to clusters and for grouping similar clusters together.

Input Phase 110

Consider an analysis component for textual content. One application of such an analysis is for use in conjunction with a news analysis domain for providing a user with a list of relevant news articles. The analysis component works at a word-token level.

A token is considered to be one or more words that represent a single concept. For instance, 'Ball', 'Explosion', and 'Space Shuttle' all reference single concepts. The text within a given article is reduced to a relevance sorted array of tokens in the following manner:

Where and how often each token appears in the text is noted.

If the token appears in the title then T occurrences are added to the word count of that token and the starting point of that token is set to zero.

The relevance of token i is set to $\exp(-a*p_{Oi})*N_i*R_i$, where a is the decay rate of token relevance as a function of the distance from the beginning of the text, $p_{Oi}$ is the position at which token i first appears in the text, $N_i$ is the number of occurrences of token i within the given article and $R_i$ is the log of the inverse document frequency of token i where the frequency is measured as the number of times the word appears one or more times in a document divided by the number of documents contained in a representative corpus. Typically, a collection of recent articles is used as the representative corpus.

The top K token-relevance pairs for each piece of content are sent to a clustering engine. The sum of the relevancies is normalized to 1.0.

Consider the following short news story:

Shuttle Disintegrates on Re-Entry

At 12:08 this afternoon, NASA announced that the space shuttle Discovery disintegrated as it was re-entering the earth's atmosphere. Witnesses in a remote area of Texas saw remnants of what was believed to be the doomed shuttle disintegrate in long white plumes that extended across the blue sky. Discovery's mission had been plagued with difficulties for the entire two weeks it had been in space. Just yesterday, Commander Smith of Discovery was quoted by communications specialists at NASA's mission control as saying "this has been a tough ride and on behalf of my crew I want to thank you guys for all the help you have given us." Smith along with the seven other mission specialists are presumed dead and NASA has confirmed that it has contacted the families of all eight crew members. In the post 9/11 sensitivity to terrorist activity, NASA made it clear there was no evidence of tampering or attacks on the space craft. President Bush has already scheduled a news conference tomorrow evening (Wednesday 8:00 PM EST) and it is speculated that by the time of the news conference NASA may have more information regarding the cause of this disaster.

Consider the word 'Shuttle' in this story. In the exemplary system, the case of the letter in a word is deemed unimportant so that 'Shuttle' and 'shuttle' are equivalent. Note, from above the term 'Shuttle' appearing in the title adds a frequency occurrence in addition to the normal frequency occurrences found in the body of the text. Assume T=2. In this news story the term 'shuttle' appears six time (four actual and two due to its presence in the title). Additionally, the first position of 'shuttle' is set to zero since it appears in the title, causing the term $\exp(-a*p_{Oi})$ to equal one.

As the document is received, it has already been classified as a 'news' document by its source. Other classifications are 'sports', 'entertainment', 'travel', etc. or subcategories of those classifications. The preprocessor software executing on the back end server maintains a database for news category documents. The database has document frequency data for thousands of words contained in currently cataloged news documents. For recently breaking news stories the frequency of certain words may start low and increase over time. For a recently received news story the occurrence of 'Shuttle' in all cataloged news documents is low so that the inverse log function is high. Based on these factors it is fairly certain that one of the K highest relevance tokens in this story is the word 'shuttle'.

For a given news article, the results of this analysis is a vector of (token, relevance) pairs having a size K, where K is the number of such pairs in the vector. A vector of the form X $(W_i, X_i)$ is formed. Each token or word W in the top K in terms of relevancy contributes to the vector and the value X for a token is determined by the above relevance formula. The value of the vector is normalized so that the value of the relevance factors $X_i$ of the K terms or tokens sums to 1.0. Based on a cursory inspection, other tokens that appear in the top K terms are 'NASA', 'space' and 'Discovery'.

The clustering component of the preprocessor employs a modified 'fuzzy k means' clustering technique. K means clustering is a well known process for grouping together data based on the similarity of the data. K means clustering is described, for example, in U.S. Pat. No. 6,012,058 to Fayyad et al which issued in January 2000. The disclosure of this patent is incorporated herein by reference.

Clustering is an important area of application for a variety of fields including data mining, statistical data analysis, and data compression. Many popular clustering techniques use a basic K means approach wherein data clusters are initialized and data is added to the initialized clusters in a hard manner, i.e., each data item belongs to one and only one cluster. In accordance with the exemplary embodiment, an information content item or document can belong to more than one cluster.

In accordance with an exemplary embodiment, each cluster is represented by the following pieces of information:

The content items (text documents for example) assigned to the cluster of a form for publication by the web server.

The top K token-relevance pairs (normalized so the sum of the relevance factors is 1.0) that represent that cluster. This set of pairs is referred to as the cluster mean.

The top L required tokens for that cluster. In order for a piece of content, such as a text document, to be added to this cluster, the content must contain within its top K token-relevance pairs all of the L required tokens. L is a number less than K and may for example be a fixed predetermined value common for all clusters. In one exemplary embodiment the value for L is set to a value that depends on language and category of document. A value of three (3) has been used with success on a system for categorizing news documents.

When a document is first received from a source 4, the document is evaluated and assigned to an existing cluster. If it cannot be assigned to a cluster, it forms its own cluster containing one document. When the token-relevance pairs for a given piece of content enter the clustering component, the process 110 shown in FIG. 3 is followed:

Retrieve all candidate clusters to which the present piece of content might belong, i.e., all clusters whose L required tokens are present in the current piece of content.

Calculate the inner product of token-relevance pairs between the piece of content and candidate clusters. The inner product is also known as the dot product of two vectors. This calculation allows the back end server to make a determination 112 of whether the content is added to a cluster.

The content is added 114 to each cluster where the inner product mentioned above exceeds a given threshold T. The determination to add occurs in one exemplary system if the inner product exceeds an empirically determined value. This value is determined based on how tightly a category of documents should be focused while maintaining a reasonable number of documents in the group or cluster and can be a dynamically varying value. When a piece of content is added to a cluster, the cluster mean is recalculated by taking the sum of all token-relevance pairs from all content assigned to that cluster; selecting the top K token-relevance pairs; and normalizing the sum of the result to 1.0. The tokens from the top L token-relevance pairs become the cluster's required tokens.

If no clusters match the input content then a new cluster is created for that content. The mean of the single document cluster is the K token-relevance pairs. The tokens from the top L token-relevance pairs become the cluster's required tokens.

Coalesce Phase 140

At periodic intervals (every few minutes in a news gathering embodiment of the invention), during what is called the Publication Cycle, the clusters are checked (FIG. 4) to see if previously separate clusters should be grouped together into a neighborhood. This process occurs during the 'coalesce phase' 140. The same process that is used to find clusters for input content is used during this phase, i.e., the inner product of cluster means is determined. However, what happens when a match is found is different.

When two or more clusters are coalesced, the means (normalized token-relevance pairs) of the clusters are not changed. However, the cluster which causes the coalescing is selected to be a parent cluster. This 'cluster of clusters' is called a neighborhood. A neighborhood can contain one or more clusters.

If cluster B is coalesced into cluster A, i.e., cluster B now has cluster A as its parent, then all the clusters which had cluster B as their parent now have cluster A as their parent and belong to the same neighborhood as A.

When the cluster membership changes, i.e., a new cluster is added to the neighborhood, or an older neighborhood expires, the content (the text documents for example) that was previously assigned to that neighborhood is assigned to a so called null neighborhood which is maintained separately from the other neighborhoods. When content first enters the clustering system it is also assigned to the null neighborhood. In the above example, when cluster B is coalesced into A, all content of B and A is assigned to the null neighborhood. Similarly, if the neighborhood expires due to the passage of time, the content of all clusters from that neighborhood is assigned to the null neighborhood.

Expiration of a neighborhood means its relevancy has fallen below a threshold as described below.

Consider the three clusters 142, 144, 146 depicted in FIG. 6A. These three clusters contain documents having similar content. However, the documents of the three clusters are not similar enough as measured by the inner product of their means to be called a neighborhood. Stated another way, the inner product of the clusters does not exceed a threshold established to group the clusters together. This threshold is typically the same as the threshold established for categorizing a document within a cluster. Now assume a cluster 148 is created and documents are added to that cluster that are similar to each other. During execution of the flowchart of FIG. 4, the cluster 148 is selected 141 and the process examines 143 neighbors 142, 144, 146 (as well as more distant clusters, note clusters are viewed as distant when their inner products are small) and determines the four clusters 142, 144, 146, 148 are similar enough to warrant creation of a neighborhood 150 (FIG. 6B). As seen in the flowchart of FIG. 4, the cluster 148 whose evaluation caused the neighborhood to be set up is chosen 145 as the parent of the neighborhood 150.

Assignment Phase 160

Although content was assigned to multiple clusters during the input stage, the content (documents) are not yet assigned to a neighborhood.

During each publication cycle an assignment phase 160 is entered. The assignment phase determines which neighborhood a piece of content should belong to. Recall that during the input phase a piece of content can be assigned to multiple clusters. Consider the situation of FIG. 7. A document 165 is assigned to the cluster 148 and a second cluster 170 of a second neighborhood 175. Thus, it is sometimes the case that during the coalesce phase 140, the clusters to which the content or document was assigned belong to separate neighborhoods, such as neighborhoods 150, 175. During publication to a user it is therefore necessary to select which neighborhood the content belongs.

During the assignment phase 160 all content assigned to the null neighborhood is selected. For each piece of content, the inner product between each cluster the article is assigned to and the article is calculated. The neighborhood to which the cluster with the highest article-cluster inner product belongs to is the neighborhood to which the article is assigned (see FIG. 5). Recall that there are two types of clusters. One type is a low level cluster, to which an article may belong. In fact the article may belong to several of these low level clusters. The second type is a neighborhood which is a cluster of clusters. An article may belong to only one neighborhood. Membership in a neighborhood is set to null when the article is brought into the system or when a neighborhood expires or when a neighborhood is split or combined. This way, the system knows which neighborhoods need to be reassigned, i.e., when the articles that previously belonged to one of the neighborhoods that changed need to be reassigned. The system uses the above process to see which cluster the article belongs to determine to which neighborhood the article should be reassigned. In the case of an expired neighborhood, reassignment is a necessity. In the case of an altered neighborhood the change to the neighborhood may cause an article to be reassigned.

Grouping Images with Neighborhoods of Documents and the Like

In accordance with an exemplary system, images received by the back end server 5 (FIG. 2) are grouped with neighborhoods of clusters based on a K vector of token-relevance pairs formed by analysis of captions accompanying the images. The captions preferably are composed and attached by the sources 4 (FIG. 2) of the images. In accordance with this exemplary system, documents and other information 3 (FIG. 2) received by the back end server 5 (FIG. 2) are grouped into clusters in an input phase 110 described previously (FIG. 3). As documents and the like are added to the clusters, the means of the clusters are updated. Periodically, during publication cycles, the clusters are assigned or re-assigned to neighborhoods in coalesce phases 140 (FIG. 4) and assignment phases 160 (FIG. 5).

An exemplary process 180 for grouping images received and stored in the preprocessor or back end server 5 into neighborhoods during each publication cycle is illustrated in FIG. 8. In accordance with the exemplary process 180, preferably performed on the back end server 5, an image is selected 182. Experience has shown that significantly fewer images than documents and other analyzable information are likely to be received during any given period of time. Consequently, the exemplary method does not assign an image to a category based on the source of that image. The caption accompanying each image is compared to all neighborhoods regardless of the categories in which the content of those neighborhoods is classified.

In the course of selection, the caption accompanying each image is analyzed to form a vector of token-relevance ordered pairs. That is, the caption is broken down into a set of word tokens. Preferably, the tokens are ranked in relevance or importance as they are extracted from the caption. The text of the caption is reduced to a relevance sorted array of tokens in the following manner:

Where and how often each token appears in the text is noted.

If the token appears in a caption title then T occurrences are added to the word count of that token and the starting point of that token is set to zero. It is anticipated that the captions accompanying images will be relatively short and lack titles. Where a caption lacks a title, no additional occurrences are added to the word count of tokens appearing in the caption. Where the caption has a title (or where the identifying tag comprises data other than a caption and does have a title) and the token appears in that title, the addition of T occurrences to the word count and the setting of the starting point of the token to zero is appropriate.

The relevance of token i is set to $\exp(-a*p_{0i})*N_i*R_i$, where a is the decay rate of token relevance as a function of the distance from the beginning of the caption, $p_{0i}$ is the position at which token i first appears in the caption, $N_i$ is the number of occurrences of token i within the caption and $R_i$ is the log of the inverse document frequency of token i in all captions. Where the captions are relatively short, the coefficient a may be set to zero so that the factor $\exp(-a*p_{0i})$ does not affect the relevance of the token i.

The top K token-relevance pairs for the caption are sent to the clustering engine. The sum of the relevancies is normalized to 1.0 (L1 norm).

Once the caption is analyzed, all candidate text document neighborhoods with which the image might be associated are retrieved 184. A neighborhood is a candidate neighborhood for a caption if the caption includes the required tokens of one or more of the member clusters of the neighborhood. The required tokens of a neighborhood's member clusters are defined as the L' tokens in the means of the clusters having the largest token relevances. Where the lengths of the captions are limited, the number of required tokens L' for use in determining whether to associate an image with a neighborhood will be less than the number of required tokens L for use in determining whether to group a document or other information into a cluster during an input stage 110 (FIG. 3). A value of two (2) has been used with success in a system for categorizing news documents.

Once the candidate neighborhoods are retrieved, the exemplary method calculates 186 the inner products between the relevances of the tokens of the caption accompanying the image and the relevances of the means of the one or more cluster members of the candidate neighborhoods. The inner product of the token-relevance vector of the caption and the mean of each cluster in the neighborhood is compared 190 to a threshold value T'. If the inner product exceeds the threshold value T', then the image which the caption accompanies is assigned 192 to the neighborhood. Where the lengths of the captions are limited, the threshold value T' for use in determining whether to associate an image with a neighborhood will be less than the threshold value T for use in determining whether to group a document or the like into a cluster during an input stage 110 (FIG. 3).

As illustrated in FIG. 9, where significantly fewer images than documents and other information are provided by the sources, an image may be assigned to more than one neighborhood. Thus, in FIG. 9, of the two neighborhoods 200 and 205, only one can contain a given cluster such as the cluster 210. The image 220, however, is shared by the two neighborhoods 200, 205. Hence, the situation illustrated in FIG. 9, in which an image is assigned to more than one neighborhood, is acceptable, whereas the situation shown in FIG. 7, where a document 165 meets the criteria for assignment to more than one neighborhood, preferably is resolved in an assignment phase 160 (FIG. 6).

To summarize, an exemplary method is as follows:

Retrieve 184 all candidate neighborhoods to which an image caption might be attached, i.e., all neighborhoods that include member clusters with 'L' required tokens are present in the current caption.

Calculate 186 the inner products of token-relevance pairs between the image caption and the clusters of candidate neighborhoods.

Assign 190, 192 the image caption to each neighborhood where the inner product between the image caption and at least one of the clusters in the neighborhood exceeds the global minimum inner product value that must be exceeded for any image assignment.

While the exemplary system has been described in terms of grouping images into neighborhoods, it is within the contemplation of the invention to group images into clusters or other groupings of documents. Likewise, it is within the contemplation of the invention to cluster images based on comparison of their accompanying captions before grouping the image clusters into neighborhoods, clusters or the like. It is noted, however, that the captions accompanying the documents might not be sufficiently long to provide enough tokens to meaningfully determine image clusters. As noted earlier, the invention is not limited to the analysis of captions and the grouping of images into neighborhoods.

During each publication cycle, grouping data for identifying grouped documents and images is stored on the back end server 5 (FIG. 2). This grouping data is accessable to the web server 7 (FIG. 2) for returning relevant information to a user or consumer 8 (FIG. 2).

Consumer Request and Publication

A user or consumer 8 is desirous of getting information in the form of a neighborhood of documents (with images or other captive data grouped into the neighborhood) from the web server 7. In a typical instance this neighborhood of documents is presented on a web browser such as Internet Explorer™ or one of a number of other browsers suitable for document presentation on a computer networked by means of either a company intranet or wide area network such as the Internet. In FIG. 2 the interchange of information between the web server 7 and the consumer 8 is by means of a request. The server responds to this request by publishing a number of documents contained in a most relevant neighborhood. Images grouped into the most relevant neighborhood are published with the neighborhood.

A consumer 8 may provide the server 7 with particularized information concerning the specific consumer. If, for example, the consumer is logged onto his or her computer, depending on its Internet interface settings, the information available from the consumer 8 includes the consumer's past browser behavior. More specifically, the information provided is the past behavior in the form of mouse 'clicks' on various links relating to different categories of documents. Thus, if the consumer is a sports fan, the category of documents may all relate to 'baseball'. If the consumer is an investor, the category of documents may predominantly be in a 'stock news' related category. If the user is not logged onto his or her computer in a way that the web server can identify specific past behavior, the consumer request is treated in a generic way and is assigned the past behavior of all such generic users.

Other information may automatically be made available to the web server 7. The source of the request may be encoded as part of the consumer's unique internet address. If so the particular language and country of the consumer may be part of the information supplied with the request. It is also possible that the request may include a specific query. Thus, the request may include a direct indication that the consumer is interested in all articles relating to the recent space shuttle events. This request would presumably cause the web server to publish back to the user the sample news article quoted above. Based on the information available to the web server 7, the server 7 responds to a request by publishing a neighborhood judged most relevant to the request. This relevancy factor is maintained by the web server for each neighborhood of documents.

Relevancy of a neighborhood changes with time. Old news is of little interest to one searching for information concerning current events. Older in time documents may be extremely relevant, however, to one having an interest in history or a chronology of events relating to an event, place or person. To determine the relevancy number or factor of a neighborhood, one must initially take into account the relevancy of an article or document.

The relevance of an article, Ar, is given as:

$$Ar=(A \cdot N)*\exp(-t*1_a)*ICB_a*PR_a.$$

A is a vector representing the keywords of article A with each element in the vector corresponding to a word and the magnitude of the element corresponding to the word relevance.

N is the vector representing the parent neighborhood of the article. This vector is based upon the means of all documents that make up the neighborhood. The inner product between A and N (written as A·N) is the similarity measure between A and N.

$1_a$ is the decay rate of articles as a function of time, which is given by t.

$ICB_a$ is a factor that rewards articles that are being presented to users from representative markets. For instance, if an article is being published to a user or consumer 8 in the United Kingdom and the publisher or source 4 of the article is also from the United Kingdom then the $ICB_a$ will be set to a large value, i.e., 10.0; otherwise, $ICB_a$ will typically take a value of 1.0.

$PR_a$ is a factor that rewards articles from valued sources. The value represents the value of the publisher. For instance, articles from the BBC typically have a click-through rate that is two times higher than the average click-through rate for a randomly selected publisher. Therefore, $PR_a$ for articles from the BBC will have a value of 2.

The relevance of an article is used in the calculation presented below used to determine the relevancy of a neighborhood of documents:

$$Nr=sum(Ar)*\exp(-t*1_n)*Sr_n.$$

The sum of Ar is taken over all articles which have the neighborhood N as their parent.

$1_n$ is the decay rate of articles as a function of time, which is given by t.

$Sr_n$ is a factor that weighs neighborhoods from different categories of documents. For instance, Sports stories might have a rating of 1.0 while World news could have a rating of 10.0. The $Sr_n$ factor can be a default for a neighborhood or could be assigned based upon an interest of a particular user or consumer based upon past behavior of that particular consumer.

Once a neighborhood's relevance falls below a threshold value as time passes for example or depending on a user request received by the web server, the neighborhood no longer passes the test of relevancy and is not returned in response to a request. Preferably, the computer includes instructions for dissolving a neighborhood (e.g., deleting grouping data for the neighborhood) when the relevancy of the neighborhood falls below a threshold value.

While the invention has been described with a degree of particularity, it is the intent that the invention include all modifications and alterations falling within the spirit or scope of the appended claims.

What is claimed:

1. A computer-implemented method executed on a processor for dynamically updating for publication captive data objects accompanied by text captions describing content of the captive data objects, respectively, where the captive data objects comprise corresponding images, the method performed by computer-implemented instructions executed on the processor, the method performed by the computer-implemented instructions comprising:

receiving the documents, the captive data objects, and text captions via a network from content providers;

extracting from the received documents respective sets of document-characterizing features, where a set of document-characterizing features characterizes the text content of its corresponding received document but not other of the documents, the extracting comprising extracting analyzing the text content to extract keywords from the documents;

forming groups of the received documents, a group comprising a set of the documents and a set of group-characterizing features comprising document-characterizing features that are common to each of the documents in the group, wherein a set of group-characterizing features is computed from an aggregation of the document-characterizing features of the documents in the group;

extracting caption features from the received text captions, where the caption features of a text caption are extracted by performing text analysis of the text caption and not the documents or the other text captions;

adding the captive data objects to various of the groups based on the caption features and not based on the images of the captive data objects, and where the captive data objects are added to groups according to determinations of relevancies of the captive data objects to the groups, where the relevancy of a captive data object to a group is computed based on both the captive data object's caption features and the group's group-characterizing features; and based on a user request for information, publishing documents or captive data objects of a group that is most relevant to the user request.

2. The method of claim 1 wherein the captive data objects comprise one or more of image data, video data and sound data.

3. The method of claim 1 wherein the received documents and the text captions each comprise multiple text features and wherein the multiple text features are ranked in importance as the multiple text features are extracted.

4. The method of claim 1, wherein the group-characterizing features are of a given feature type, the method further comprising:

ranking the group-characterizing features of a group by importance to the group;

selecting the caption features based on their being of the given feature type;

ranking the caption features in importance as the caption features are obtained from the text captions; and taking an inner product based of the group-characterizing features of the received documents and the caption features of a corresponding text caption;

wherein the text caption has at least the portion of the common characterizing features of the received documents when the inner product based on the common characterizing features of the received documents and the multiple features of said one text caption exceeds a threshold.

5. The method of claim 1, wherein the common characterizing features are text features, further comprising:

ranking the common characterizing features of the received documents in importance;

extracting multiple text features from one of the text captions;

ranking the multiple text features in importance as the multiple text features are extracted from said one text caption; and taking an inner product based on the common characterizing features of the received documents and the multiple text features of said one text caption;

wherein said one text caption has at least the portion of the common characterizing features when (i) the text caption includes required text features of the common characterizing features and (ii) the inner product based on the common characterizing features and the multiple text features exceeds a threshold.

6. One or more computer readable storage media storing information for a computing device to perform a process for evaluating received documents and images, each image being accompanied by a textual caption describing content of its accompanying image, where each image is not an object encompassed in a text article to be published but rather comprises content for independent publication and is received via a network from a content provider, the process comprising:

evaluating multiple documents containing text data for subsequent publication by, for a given document, extracting K document tokens having the highest token relevance factor based on the frequency of a document token within the document;

evaluating the textual captions to extract caption tokens in the textual captions that are most relevant to the textual captions based on their frequency in their respective textual captions;

forming clusters of the documents by grouping together documents having a measure of commonality of the text data, according to the extracted document tokens, that is greater than a threshold, a cluster comprising grouped documents and a set of cluster-characterizing tokens comprised of document tokens from the documents grouped in the cluster;

grouping the document clusters to form neighborhoods of clusters, a neighborhood comprising a plurality of clusters, where the neighborhoods are formed based on the document tokens;

grouping some of the images into a neighborhood of clusters, but not into a cluster, by:

i) comparing the caption tokens of the images with the cluster-characterizing set of tokens for each cluster of the neighborhood; and ii) adding an image to the neighborhood if the comparison indicates a sufficient degree of similarity between the caption accompanying the image and at least one cluster of the neighborhood;

wherein an image is grouped without an analysis of the image; and publishing documents or images assigned to a specified document cluster or neighborhood based upon a request.

7. The computer readable storage media of claim 6 wherein a caption token is assigned a relevance factor based on its context within the corresponding caption.

8. The computer readable storage media of claim 7 wherein the token relevance factor is determined from a relation $N_i * R_i$, where $N_i$ is the number of occurences of token i and $R_i$ is the log of the inverse document frequency of token i based on a corpus of textual data.

9. The computer readable storage media of claim 7 wherein the token relevance factor is determined from a relation $\exp(-\alpha * p_{Oi}) * N_i * R_i$, where a is a decay rate of token relevance as a function of the distance from the beginning of the text of a document D, poi is the position at which token i first appears in the text, Ni is the number of occurences of token i and $R_i$ is the log of the inverse document frequency of token i based on a corpus of textual data.

10. The computer readable storage media of claim 6 wherein the neighborhood is assigned a neighborhood relevancy factor which varies with time, said neighborhood relevancy factor being used to determine which neighborhood to publish for the request.

11. The computer readable storage media of claim 10 wherein the neighborhood relevancy number also varies with document relevancy factors of documents that make up the neighborhood.

12. The computer readable storage media of claim 10 wherein a document relevancy factor depends on indicia of a quality of a source of the document corresponding to the document relevancy factor.

13. The computer readable storage media of claim 10 wherein the document relevancy factor depends on the location of a source of the document and a location of a requestor that made the request.

14. A computer readable medium containing instructions for dynamically updating for publication image objects accompanied by text captions, the computer readable medium comprising instructions for:

extracting from received documents respective sets of document keyword features which characterize the received documents, the document keyword features of a document having been extracted from the document by analysis of text of the document and computation of relevancy to the document;

receiving the image objects and corresponding text captions from various providers via a network, the image objects being provided as items for publication per se, and extracting from the text captions respective sets of caption keyword features, the caption keyword features having been extracted from the text captions by analysis of the text captions and computation of relevancy to the text captions;

forming groups of documents by grouping together documents having in common document keyword features of their respective sets of document keyword feature sets, a group of documents comprising group-characterizing keyword features selected from among document keyword feature sets of the documents in the group, and adding the image objects to the groups by comparing the caption keyword features with the group-characterizing keyword features, wherein the image objects are grouped based on an analysis of the text captions and without an analysis of the image objects, wherein after a image object is added to a group the group-characterizing keyword features of the group are re-computed taking into account the caption keyword features of the image object; and publishing, based on a user request comprising requested information, the documents or image objects in a group having group-characterizing keyword features that correspond to the requested information.

15. The computer readable medium of claim 14 wherein the captive data objects comprise a combination of one or more of image data, video data and sound data.

16. The computer readable medium of claim 14 wherein documents comprise a combination of one or more of text data, image data, sound data, or video data.

17. The computer readable medium of claim 14 wherein the computer readable medium includes instructions for ranking the multiple text features in importance as the multiple text features are extracted.

18. The computer readable medium of claim 14, wherein the caption keyword features, document keyword features, and group-characterizing keyword features are of a given type, further comprising instructions for:

ranking in order of importance the group-characterizing keyword features of each cluster of a neighborhood of clusters;

ranking the caption keyword features of one of the text captions in order of importance to the one of the text captions; and taking inner products of the group-characterizing features of each cluster of the neighborhood of clusters and the caption keyword features of said one text caption;

wherein the image object of said one text caption is added to the neighborhood of clusters when the inner product of the at least one cluster and the caption keyword features of said one text caption exceeds a threshold.

19. The computer readable medium of claim 14, wherein the common characterizing features are text features, further comprising instructions for:

ranking the document keyword features of the received documents in order of importance;

ranking, in order of appearance, the multiple caption keyword features of one of the captions; and taking an inner product based on the document keyword features of the received documents and the caption keyword features of said one text caption;

wherein the image object of said one text caption is added to a group of documents when (i) the caption keyword features of the one text caption includes required features of the corresponding group-characterizing keyword features and (ii) the inner product exceeds a threshold.

20. A computer-implemented method executed on a processor for forming groups that include both image objects and documents for publication, the image objects to be individually published, the method being performed by computer-implemented instructions executed on the processor, the method performed by the computer-implemented instructions comprising:

receiving from different network sources the image objects and accompanying respective text captions, a text caption describing its accompanying image object;

receiving from different network sources documents comprising text content;

performing text analysis on the received documents to obtain relevancies of document keywords in the documents, and using the document keywords and relevancies to cluster the documents into groups, wherein a group includes a list of group keywords that all documents in the group have among their respective document keywords, the group keywords being selected from the document keywords of the documents in the group such that the group keywords comprise document keywords common to each of the documents in the group, and wherein the group keywords have respective group relevancies, the group relevancies being computed based on the document relevancies of the documents in the group such that a group relevancy indicates relevancy of its group keyword to the corresponding group as a whole;

performing text analysis on the received captions to obtain caption relevancies of caption keywords in the captions, a caption relevancy of a caption keyword indication relevancy of the caption keyword to its corresponding caption;

for a given of the image objects, for each group of a plurality of the groups, computing relevancies of the given image object to each of the groups in the plurality, respectively, wherein the relevancy of the given image object to one of the groups is computed based on both its caption keywords and respective caption relevancies and also based on the group keywords and group relevancies of the one of the groups; and identifying one of the groups most relevant to a user-specified request and publishing the documents or image objects of the group.

* * * * *

UNITED STATES PATENT AND TRADEMARK OFFICE
CERTIFICATE OF CORRECTION

| | | |
|---|---|---|
| PATENT NO. | : 7,523,109 B2 | Page 1 of 1 |
| APPLICATION NO. | : 10/746627 | |
| DATED | : April 21, 2009 | |
| INVENTOR(S) | : Christopher Weare | |

It is certified that error appears in the above-identified patent and that said Letters Patent is hereby corrected as shown below:

In column 16, line 19, in Claim 16, delete "wherein" and insert -- wherein the received --, therefor.

Signed and Sealed this
Third Day of May, 2011

David J. Kappos
*Director of the United States Patent and Trademark Office*